UNITED STATES PATENT OFFICE.

MAX WALLERSTEIN AND LEO WALLERSTEIN, OF NEW YORK, N. Y.

EXTRACT HAVING THE FLAVOR AND AROMA OF MALT AND PROCESS OF PRODUCING THE SAME.

1,214,730.      Specification of Letters Patent.      Patented Feb. 6, 1917.

No Drawing.      Application filed June 21, 1916. Serial No. 104,918.

*To all whom it may concern:*

Be it known that we, MAX WALLERSTEIN and LEO WALLERSTEIN, citizens of the United States, residing in the city, county, and State of New York, have invented certain new and useful Improvements in Extracts Having the Flavor and Aroma of Malt and Processes of Producing the Same, fully described and represented in the following specification.

This invention relates to a novel composition or synthetic extract having a flavor and aroma similar to that of malt, and a method or process of making the same.

The invention consists in the novel extract and in the novel procedure hereinafter set forth in the specification and then specifically pointed out.

In carrying the invention into effect, certain sugars, such as invert sugar, maltose, dextrose, and levulose, which have the capacity during the reaction hereinafter referred to, of developing a flavor and aroma similar to that of malt, are allowed to react with amino bodies, *i. e.*, bodies containing amino acids either free or in compounds. The amino bodies which it is preferred to use are those which have the characteristics of the amino bodies developed by the hydrolyzation or digestion of proteins. According to a method of producing these amino bodies which has been successfully employed, the proteins of yeast are hydrolyzed by allowing the yeast to undergo self-digestion or autolysis while suspended in water for a proper period of time and at a proper temperature. While both the time and temperature may be varied, a temperature of, say, 50° C., during a period of from twenty-four to seventy-two hours, will give satisfactory results. Particularly satisfactory results are obtained, especially with respect to yield, by allowing the auto-digestion to proceed at a temperature of about 50° C. for about forty-eight hours, after which time the yeasty liquid will be found to contain a large percentage of the amino bodies referred to. The proportions of yeast and water employed in the auto-digestion may be varied, but excellent results are obtained by employing approximately one part of compressed yeast to two parts of water.

It will usually be found advantageous to filter the autolyzed yeasty liquid, although this is not necessary. When filtration is employed, the yeasty liquid should be raised to about the boiling point, as the process of filtration is assisted thereby.

Water interferes with the reaction hereinafter referred to, and, therefore, the amino-body-containing liquid should have the major part of the water removed therefrom. This is done by evaporation, and the evaporation should be continued until the mass is well concentrated, *i. e.*, in a syrupy or pasty condition. If desired, evaporation may be continued until the resulting mass is dry. The thick pasty mass, which then has a strong meaty flavor and taste, is mixed with a sugar which has the capacity of reacting with the amino bodies of the mass to deprive the mass of its meaty flavor and produce instead a flavor and aroma similar to that of malt. Invert sugar, maltose, dextrose and levulose, may be mentioned as suitable for the purpose. From a practical point of view, corn syrup, which can be cheaply and readily obtained commercially, is well adapted for the purpose.

The concentrate containing the amino bodies and the sugar is thoroughly mixed. When corn syrup is used, from five to ten per cent. of the concentrate mixed with the syrup gives excellent results, although the proportions may vary. The mixture is then allowed to react at a temperature favorable to such reaction. Excellent results are obtained by subjecting the mixture to a temperature of about 90° C., although results may be obtained at temperatures which vary 90 from 90° C. The mixture is maintained at this temperature until the reaction is completed, say, from one to four hours, and during the reaction it is desirable to stir the mixture to insure thorough mixing. The reaction may be regarded as completed when the resulting composition or extract has a flavor and aroma similar to that of malt, and the strong meaty flavor and aroma of the amino bodies have disappeared. While the flavor and aroma of this extract are, as has been said, similar to the flavor and aroma of malt, the so-called "worty" taste which is characteristic of malt extract solutions, is not present in this extract or in solutions thereof.

This composition of extract is agreeable in taste, highly nutritious, has excellent keeping qualities, and may be utilized in various ways. An especially valuable use of the extract is in making beverages which have the flavor and aroma of malt.

In an application filed of even date herewith there is described a method of employing this extract in making a beverage having the taste and aroma of such beverages as are made from malt.

What is claimed is:—

1. A composition or synthetic extract having an aroma and flavor similar to that of malt and containing the reaction products of amino bodies and sugar.

2. A composition or synthetic extract having an aroma and flavor similar to that of malt and containing the reaction products of amino bodies having the characteristics produced by the hydrolyzation of proteins, and sugar.

3. The process of producing an extract consisting in allowing amino bodies to react with a sugar which has the characteristic during the reaction of developing an aroma and flavor similar to that of malt, the reaction being carried on until this characteristic flavor and aroma are developed.

4. The process of producing an extract consisting in mixing amino bodies having the characteristics of amino bodies produced by the hydrolyzation of proteins with a sugar or sugars having the characteristic of reacting with such amino bodies to produce a flavor and aroma similar to that of malt, the mixture being in concentrated condition, and allowing the mixture to react until the flavor and aroma of malt are produced.

5. The process of producing an extract consisting in mixing amino bodies having the characteristics of amino bodies produced by the hydrolyzation of proteins with a sugar or sugars having the characteristic of reacting with such amino bodies to produce a flavor and aroma similar to that of malt, the mixture being in concentrated condition, and allowing the mixture to react until the flavor and aroma of malt are produced, the mixture being maintained at a temperature of about 90° C. during the reaction period.

6. The process of producing an extract consisting in producing amino bodies by the hydrolyzation of proteins, concentrating the hydrolyzation product, mixing with said concentrated product a sugar or sugars having the characteristic of reacting therewith to produce a flavor and aroma similar to that of malt, allowing the mixture to react until said flavor and aroma are produced, the mixture being maintained at a temperature of about 90° C. during the reaction period.

7. The process of producing an extract consisting in mixing amino bodies obtained by concentrating autolyzed yeast, with a sugar having a capacity of reacting with said bodies to produce a flavor and aroma similar to that of malt, and allowing the reaction to proceed until said flavor and aroma are developed.

8. The process of producing an extract consisting in mixing amino bodies obtained by concentrating autolyzed yeast, with a sugar having a capacity of reacting with said bodies to produce a flavor and aroma similar to that of malt, and allowing the reaction to proceed until said flavor and aroma are developed, the mixture being maintained at a temperature of about 90° C. during the reaction period.

9. The process of producing an extract which consists in mixing amino bodies obtained by concentrating autolyzed yeast, with corn syrup, and allowing the mixture to react until a flavor and aroma similar to that of malt is produced.

10. The process of producing an extract which consists in mixing amino bodies obtained by autolyzing yeast and concentrating the autolyzed product, with corn syrup, the mixture being allowed to react at a temperature of about 90° C. until the characteristic flavor and aroma of malt are produced.

In testimony whereof, we have hereunto set our hands in the presence of two subscribing witnesses.

MAX WALLERSTEIN.
LEO WALLERSTEIN.

Witnesses:
A. WHITE,
J. F. DONOVAN.